(12) United States Patent
Kerwin

(10) Patent No.: US 10,960,855 B2
(45) Date of Patent: Mar. 30, 2021

(54) ROBOTIC WHEEL CLEANER

(71) Applicant: ARKK ENGINEERING, Oak Park, MI (US)

(72) Inventor: Kevin R. Kerwin, Oak Park, MI (US)

(73) Assignee: INTERNATIONAL WHEEL AND TIRE, INC., Farmington Hills, MI (US)

(*) Notice: Subject to any disclaimer, the term of this patent is extended or adjusted under 35 U.S.C. 154(b) by 460 days.

(21) Appl. No.: 15/324,154

(22) PCT Filed: Jul. 7, 2015

(86) PCT No.: PCT/US2015/039375
§ 371 (c)(1),
(2) Date: Jan. 5, 2017

(87) PCT Pub. No.: WO2016/007511
PCT Pub. Date: Jan. 14, 2016

(65) Prior Publication Data
US 2017/0197595 A1    Jul. 13, 2017

Related U.S. Application Data

(60) Provisional application No. 62/021,280, filed on Jul. 7, 2014.

(51) Int. Cl.
B08B 1/00         (2006.01)
B60S 3/04         (2006.01)
(Continued)

(52) U.S. Cl.
CPC ............... B60S 3/042 (2013.01); B08B 1/00 (2013.01); B08B 1/006 (2013.01); B08B 1/04 (2013.01); B25J 11/0085 (2013.01)

(58) Field of Classification Search
CPC ... B08B 1/00; B08B 1/04; B08B 1/006; B25J 11/0085; B60S 3/042
See application file for complete search history.

(56) References Cited

U.S. PATENT DOCUMENTS 2,613,532 A * 10/1952 Jones ...................... G01M 1/30
                                              73/487
2,613,533 A * 10/1952 Jones ...................... G01M 1/30
                                              73/487

(Continued)

FOREIGN PATENT DOCUMENTS

EP    0684464 A2    11/1995

OTHER PUBLICATIONS

PCT International Search Report and Written Opinion dated Oct. 28, 2015 for PCT/US15/39375.
EESR dated Mar. 21, 2018 for EP15819210.4.

Primary Examiner — Alexander Markoff
(74) Attorney, Agent, or Firm — Brooks Kushman, P.C.

(57) ABSTRACT

A robotic wheel cleaner configured for performing a cleaning operation on a wheel is disclosed. The robotic wheel cleaner comprises a selectively moveable arm that is operatively connected to a body portion at a first end thereof. A cleaning tool is operatively connected to a second end of the moveable arm. The cleaning tool further comprises cleaning pad configured for selectively engaging at least a first predetermined location of a wheel. The cleaning tool is selectively movable along a first predetermined pathway to clean at least a predetermined portion of the wheel. The robotic wheel cleaner can further be actuated to move the cleaning tool to position the cleaning pad at least a second predetermined location of the wheel and to selectively move the cleaning pad along a second predetermined pathway to clean at least a second predetermined portion of the wheel.

10 Claims, 11 Drawing Sheets

(51) Int. Cl.
   *B25J 11/00*   (2006.01)
   *B08B 1/04*   (2006.01)

(56) References Cited

U.S. PATENT DOCUMENTS

| | | | | |
|---|---|---|---|---|
| 2,622,436 A * | 12/1952 | Carr | ......................... | G01M 1/22 |
| | | | | 73/476 |
| 2,752,788 A * | 7/1956 | La Penta | ................. | G01M 1/04 |
| | | | | 73/487 |
| 2,979,958 A * | 4/1961 | Kennedy | ................ | G01M 1/12 |
| | | | | 73/483 |
| 3,690,010 A * | 9/1972 | Kiedrowski | ............. | G01B 5/00 |
| | | | | 33/555 |
| 4,034,786 A * | 7/1977 | Feldmann | ............... | B60B 30/06 |
| | | | | 157/18 |
| 4,129,950 A * | 12/1978 | Weinhaus | ................ | G01B 3/30 |
| | | | | 33/203.19 |
| 4,336,716 A * | 6/1982 | Poppell | .................. | G01M 1/12 |
| | | | | 73/480 |
| 4,663,971 A * | 5/1987 | Bakula | .................... | G01M 1/12 |
| | | | | 73/480 |
| 5,412,878 A * | 5/1995 | Edman | ................. | G01B 5/0025 |
| | | | | 33/203 |
| 6,425,639 B1 * | 7/2002 | Getzelman | ............. | B05B 12/30 |
| | | | | 301/37.103 |
| 7,325,268 B1 * | 2/2008 | Curcuri | ................... | B08B 1/00 |
| | | | | 15/21.1 |
| 8,182,639 B2 | 5/2012 | Donnay et al. | | |
| 2010/0147458 A1 * | 6/2010 | Donnay | ................. | F16F 15/324 |
| | | | | 156/281 |
| 2012/0073764 A1 | 3/2012 | Lawson et al. | | |
| 2012/0274125 A1 * | 11/2012 | Waldt | .................... | B05B 12/30 |
| | | | | 301/37.106 |
| 2014/0154954 A1 * | 6/2014 | Hunt | ..................... | B24B 19/14 |
| | | | | 451/11 |
| 2017/0106411 A1 * | 4/2017 | Peinelt | ................... | B08B 1/002 |

* cited by examiner

ROBOTIC WHEEL CLEANER

CROSS-REFERENCE TO RELATED APPLICATION

This application is the U.S. national phase of PCT Application No. PCT/US2015/039375 filed on Jul. 7, 2015 which claims the benefit of U.S. Provisional Application Ser. No. 62/021,280 filed on Jul. 7, 2014, the disclosures of which are incorporated in their entirety by reference herein.

TECHNICAL FIELD

The present disclosure relates generally to wheel/tire assemblies and more specifically to a robotic wheel cleaner for use in a weight apply operation of a wheel/tire assembly process.

BACKGROUND

Rotating elements are used in many different applications, including, for example, automotive applications. Any weight imbalance in rotating elements may result in undesirable vibration. In the automotive industry, for example, such vibration can undesirably impact wear on vehicle components or create a poor vehicle driving experience for riders in a vehicle. To avoid these issues, it is known to subject rotating elements to a balancing operation. More specifically, using vehicle wheels as an example, a balancing machine may be utilized during the manufacturing process to spin a wheel assembly to determine which, if any, points of the wheel may require more weight to more evenly distribute weight of the assembly, as well as how much weight to apply to each of the identified points.

Once the points for applying weight material have been identified, individual weight segments may be applied in a weight apply operation. The individual weight segments typically include an integrated adhesive backing or other arrangement for adhering the weights to an inside surface of a wheel. However, to ensure that the weight segments properly adhere to the wheel, the inside surface of the wheel should be properly cleaned.

Traditionally, cleaning the inside surface of the wheel has been a manual operation. As such, the operation of a wheel/tire assembly process measurably slows down while the inside surface of the wheel is properly cleaned. What is needed is an automated method of properly cleaning the inside surface that maximizes assembly time.

SUMMARY

In one exemplary arrangement, a robotic wheel cleaner that is configured for performing a cleaning operation on a wheel is disclosed. The robotic wheel cleaner comprises a selectively moveable arm, and a cleaning tool attached to the moveable arm. The selectively moveable arm is operatively connected to a body portion at a first end thereof. The cleaning tool is operatively connected to a second end of the moveable arm. The cleaning tool further comprises a cleaning pad configured for selectively engaging at least a first predetermined location of a wheel. The cleaning tool is selectively movable along a first predetermined pathway to clean at least a predetermined portion of the wheel. In one exemplary arrangement, the first predetermined pathway is an arc that is less than 90 degrees from a center axis of the wheel.

In one exemplary arrangement, the cleaning tool further comprises a mounting bracket to which a holder element is attached. The cleaning pad is mounted to the holder element. In one exemplary arrangement, the cleaning pad is removably attached to the holder element to allow for selectively replacement of the cleaning pad.

In one exemplary arrangement, the mounting bracket may further include a channel therethrough that receives at least one fastener element to selectively position the holder element along the mounting bracket. The mounting bracket may further comprise indicia that is indicative of the position of the holder element for accommodate various sized wheels.

In one exemplary arrangement, the moveable arm is configured to move to a second predetermined location of the wheel, wherein the cleaning tool is selectively movable along a second predetermined pathway to clean at least a second predetermined portion of the wheel. The second predetermined pathway is positioned approximately 180° from the first predetermined pathway. In one exemplary arrangement the second predetermined pathway is an arc that is less than 90 degrees from a center point in the wheel.

In one exemplary arrangement, a force feedback sensor is operatively connected to the cleaning tool. The force feedback sensor is operatively connected to a controller and the controller will prevent the cleaning tool from moving along the first predetermined pathway unless a threshold of force is detected by the force feedback sensor.

A method of performing a cleaning operation for a wheel is also disclosed.

DETAILED DESCRIPTION

Figure 1:
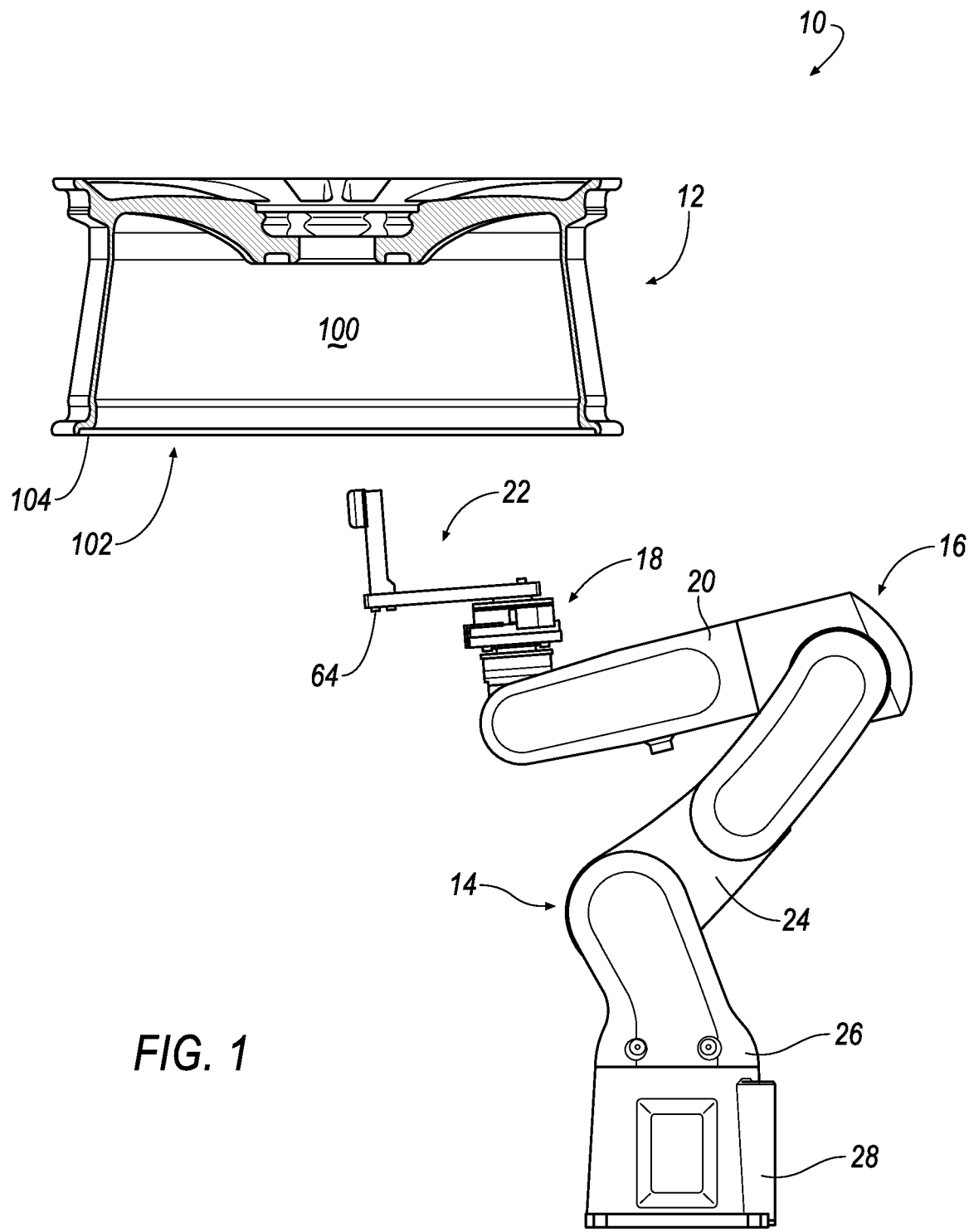
FIG. 1 is a side elevational view of a robotic wheel cleaner in a retracted position with respect to a wheel.

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Referring to FIGS. 1-7, an exemplary arrangement of a robotic wheel cleaner 10 is shown. The robotic wheel cleaner 10 is configured for cleaning at least predetermined portions of a wheel 12 so as to ensure that weight material may be properly applied and retained on the wheel 12. For ease of explanation, a cross-sectional view of the wheel 12 is shown, with a tire removed. Further, a separate stage for holding the wheel 12 during the cleaning operation is omitted. The robotic wheel cleaner 10 may include at least a first articulated joint 14, a second articulated joint 16, and a wrist 18. An arm 20 is positioned between the second articulated joint 16 and the wrist 18. A cleaning tool 22 is selectively attachable to the wrist 18 of the robotic wheel cleaner 10. Details of the cleaning tool 22 will be described in further detail below. A controller (not shown) may be operatively connected to the robotic wheel cleaner 10 to control its operation.

The second articulated joint 16 is mounted to a body portion 24 that is operatively connected to a foot member 26 via the first articulated joint 14. The foot member 26 is connected to a base portion 28. In one exemplary arrangement, the foot member 26 is rotatably-connected to the base portion 28 such that the foot member 26 may be pivoted relative to the base portion 28. This pivoting motion allows for the body portion 24 and arm 20 to be pivoted with respect to the base portion 28. Further, the body portion 24 is also hingedly connected to the foot member 26 such that the body portion 24 may be articulated vertically relative to the base portion 28 (as may be seen in FIGS. 2-3).

Figure 2:
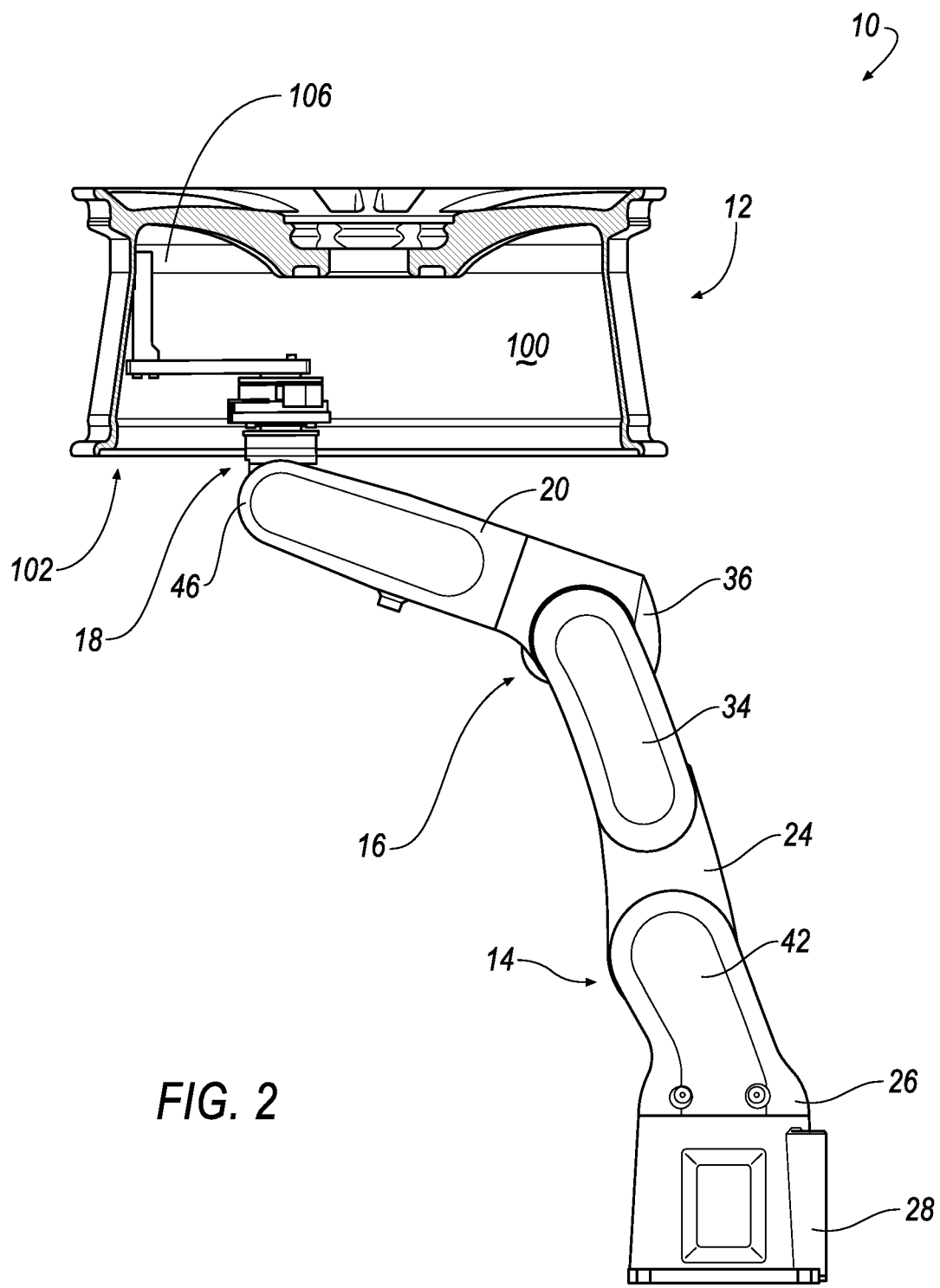
FIG. 2 is a side elevational view of the robotic wheel cleaner in a first upper plane cleaning start position.
Figure 3:
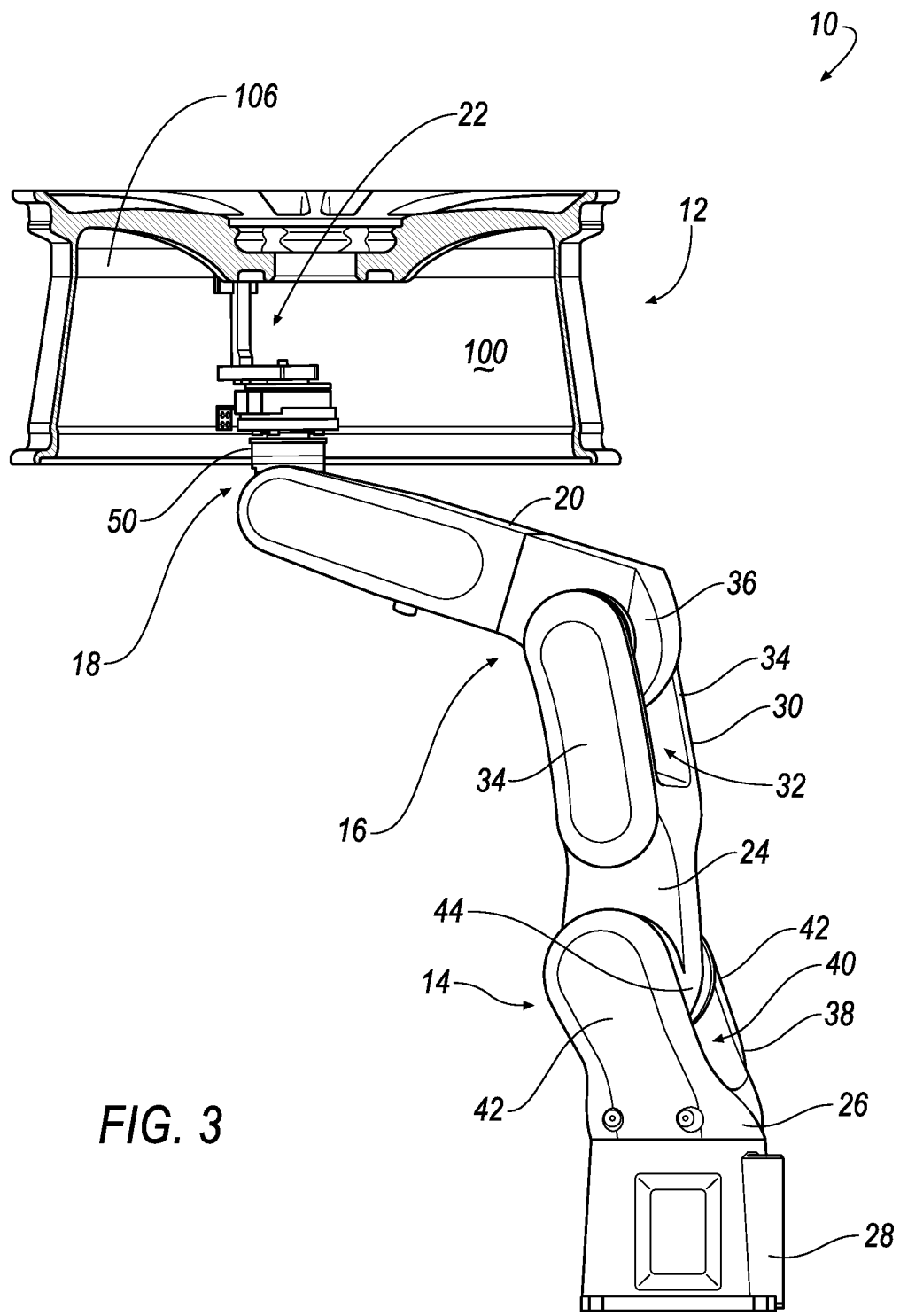
FIG. 3 is a side elevational view of the robotic wheel cleaner in a first upper plane end position.

In one exemplary embodiment, the arm 20 may be connected to the body portion 24 such that the arm 20 may be articulated in any desirable upward or downward position relative the body portion 24. Referring to FIGS. 2-3, in one exemplary arrangement, the body portion 24 may include a yoke member 30 that defines a channel 32 between opposing wall members 34. An end portion 36 of the arm 20 is disposed within the channel 32 and pivotly attached thereto at second articulated joint 16.

The foot member 26 also includes a yoke member 38 that defines a channel 40 between opposing wall members 42. An end portion 44 of the body portion 24 is disposed within the channel 40 and pivotly attached thereto at the first articulated joint 14.

Mounted to the wrist 18 is a cleaning tool 22. Details of the wrist 18 and cleaning tool 22 will be discussed in greater detail in connection with FIGS. 7A-7C. Wrist 18 includes a moveable canister 48 (best seen in FIG. 7B) into which a movable mount element 50 is positioned. The moveable canister 48 is positioned at an operational end 46 of the arm 20 and is movable a predetermined amount about a first axis A-A. The movable mount element 50 is rotatably about a second axis B-B that is generally perpendicular to the first axis A-A. An adapter plate 52 is secured to a top end 53 of the movable mount element 50. A portion of the cleaning tool 22, namely mounting bracket 54, is operably connected to mount element 50. In one example, a force sensing unit 55 may be positioned between the adapter plate 52 and the mounting bracket 54.

Figure 7A:
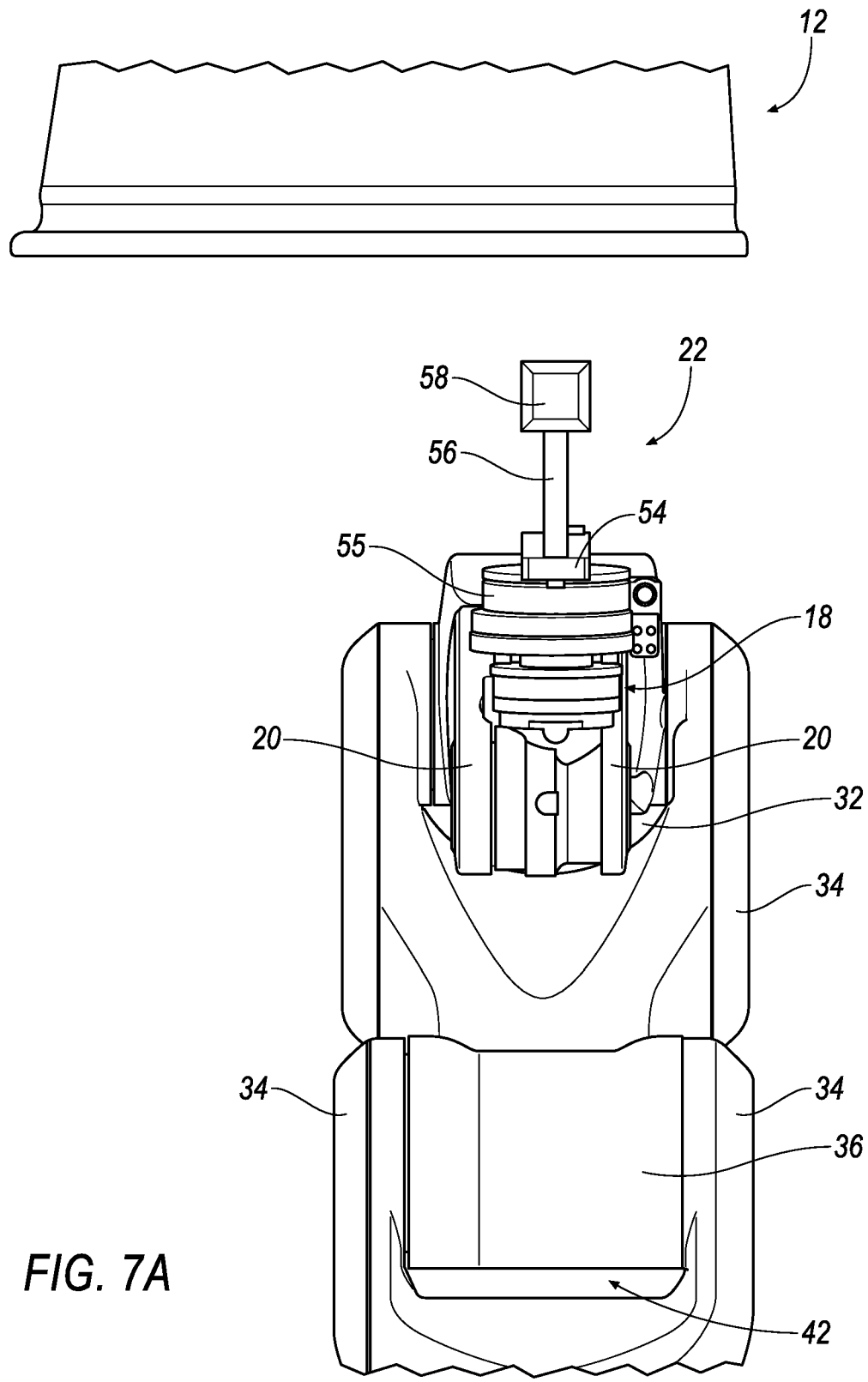
FIG. 7A is a front elevational view of a cleaning tool mounted to a wrist of the robotic wheel cleaner.
Figure 7B:
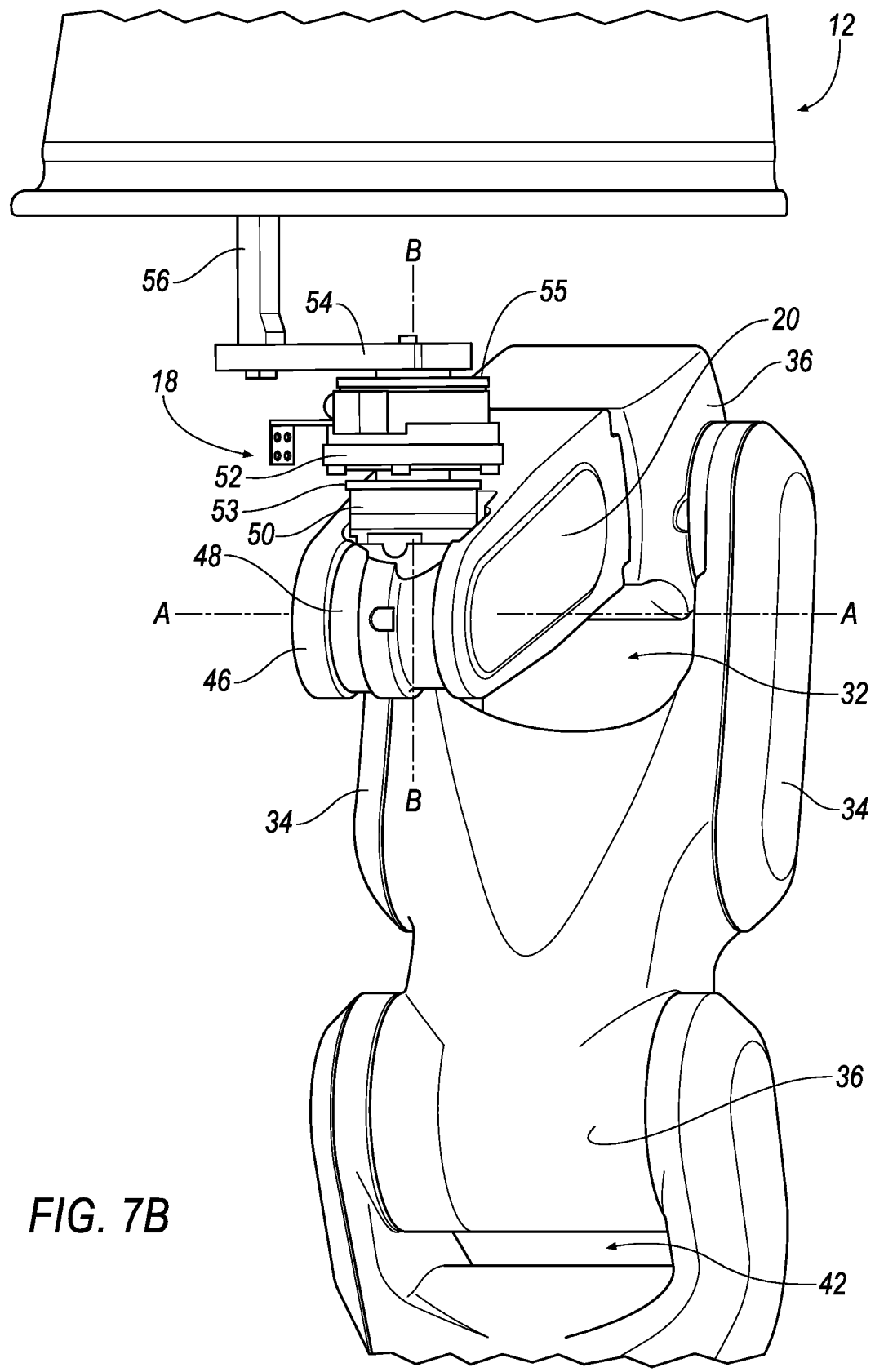
FIG. 7B is a partial front perspective view of the cleaning tool of FIG. 7A.
Figure 7C:
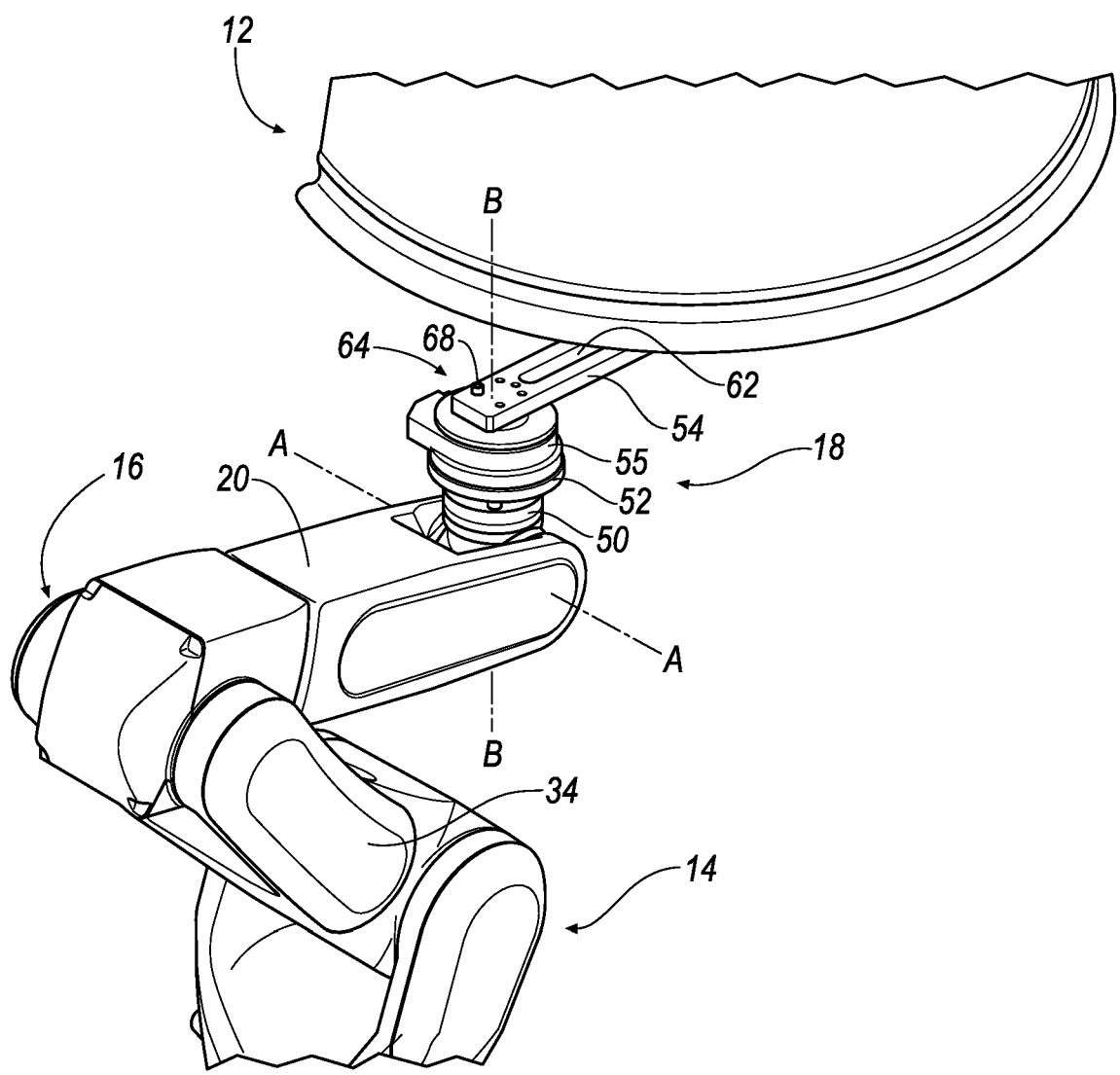
FIG. 7C is a partial top perspective view of the cleaning tool of FIG. 7A.
Figure 7D:
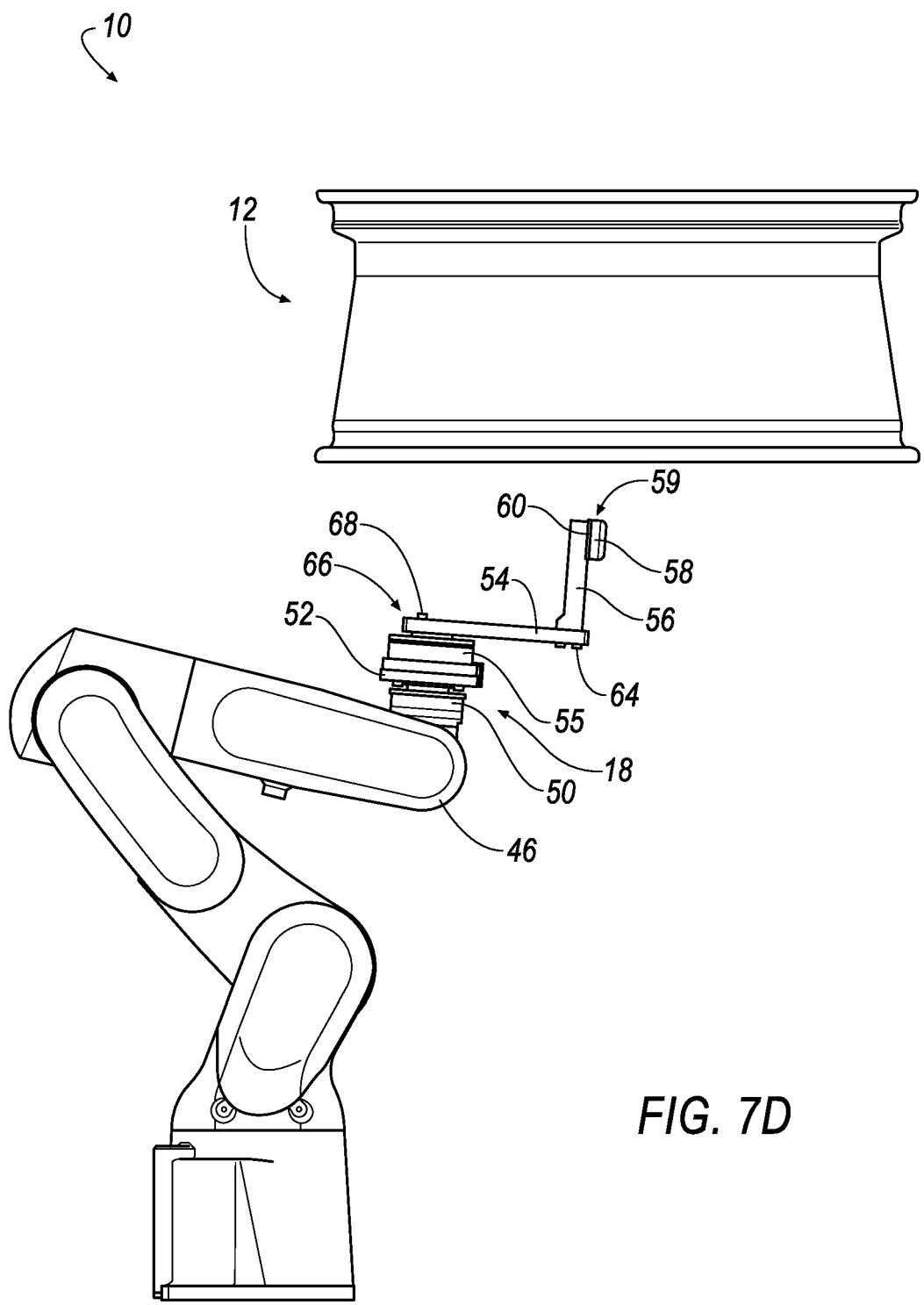
FIG. 7D is a side elevational view of the cleaning tool of FIG. 7D.

As best seen in FIG. 7D, further details of the cleaning tool 22 will be discussed. Cleaning tool 22 comprises the mounting bracket 54 to which a holder element 56 is attached. The holder element 56 carries a cleaning implement such as a cleaning pad 58 at an operational end 59 of the holder element 56. In one exemplary arrangement, the cleaning pad 58 is removably attached to the holder element 56 to allow for replacement of a used cleaning pad 58. In one example, the cleaning pad 58 may be secured to a mounting plate 60 that is selectively attached to the holder element 56 by fasteners (not shown) extending through a portion of the holder element 56. However, other mechanisms for attaching a cleaning pad 58 to the operational end 59 of the holder element 56 are also contemplated.

In one example, the mounting bracket 54 may further include a channel 62 (shown FIG. 7C) therethrough. The channel 62 may receive at least one fastener element 64 to selectively position the holder element 56 along the mounting bracket 54 to selectively adjust the cleaning tool 22 for use with various sized wheels. More specifically, the fastener element 64 may be loosened to allow the holder element 56 to slide along the mounting bracket 54 to various positions. In one exemplary arrangement, the mounting bracket 54 may be provided with indicia (such as markings or etchings) that are indicative of certain standard wheel sizes to allow for quick and easy adjustment. For example, the indicia may be provided on a top surface of the mounting bracket 54 that an edge of the holder element 56 may be aligned with. A non-operational end 66 of the mounting bracket 54 is fixedly connected to the force sensing unit 55 by one or more fasteners 68.

Figure 8:
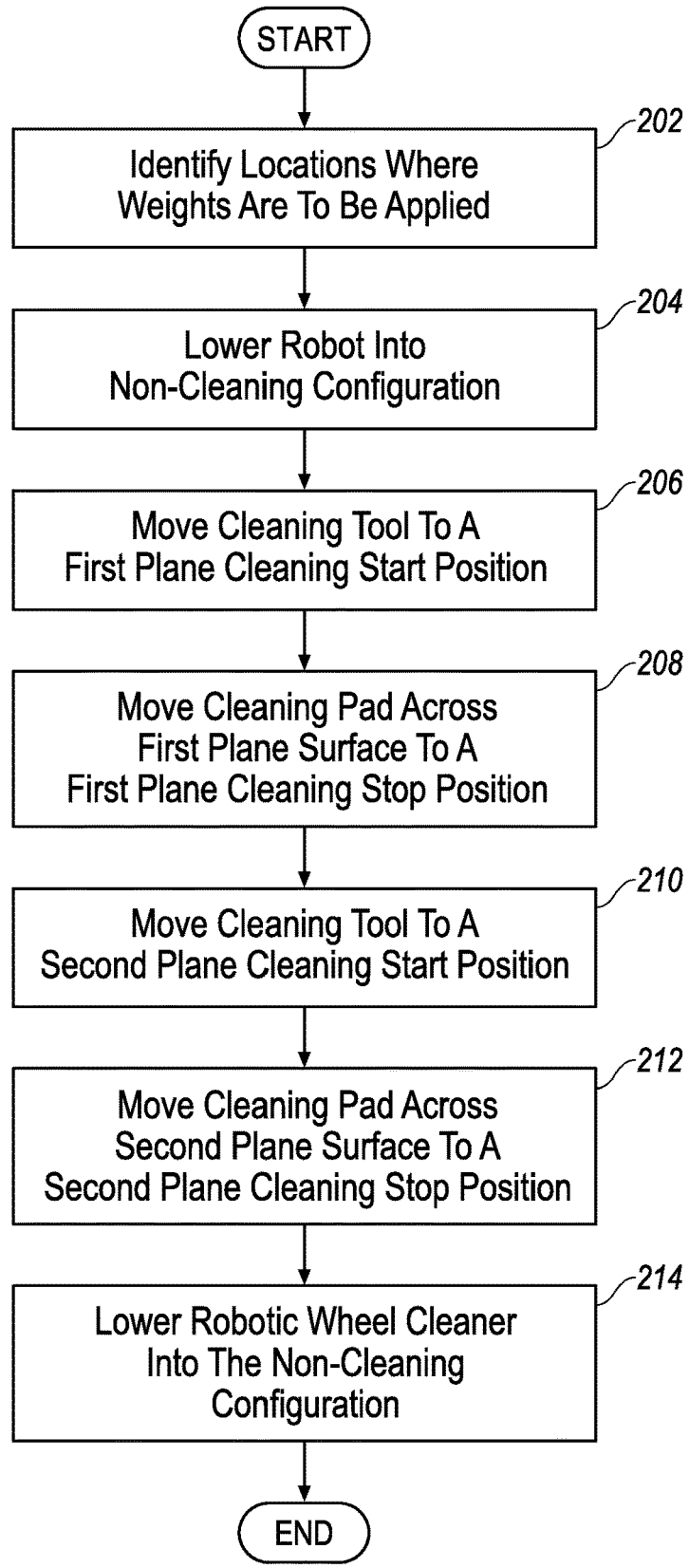
FIG. 8 is a flow chart illustrating the operation of the robotic wheel cleaner.

Turning to FIG. 8, as well as FIGS. 1-7, a cleaning operation utilizing the robotic wheel cleaner 10 will now be described in connection with process flow 200. More specifically, the purpose of the robotic wheel cleaner 10 is to clean at least selected areas on an inner surface 100 of a wheel 12 where balance weights (not shown) are to be applied so that the balance weights properly wet-out and adhere properly to predetermined locations of the wheel 12. As the balance weights need only be applied at certain locations, to provide an efficient cleaning process, the robotic wheel cleaner 10 may only need to operate to clean predetermined areas of the inside surface of the wheel 12. Thus, in one exemplary arrangement, the process 200 starts with the initial step 202 of identifying the predetermined locations of the wheel 12 to which weights are to be applied. These locations may be identified in any suitable manner. Once identified, the location information is programmed into the controller.

Once the predetermined locations of the wheel 12 are identified, the wheel 12 may be positioned at a cleaning station (not shown) such that the wheel 12 is in an elevated position, with an open end 102 of the wheel facing downwardly, as shown in FIGS. 1-6. In some exemplary arrangements, step 202 may be performed in the same location that the remaining steps of the cleaning operation are performed.

In step 204, the robotic wheel cleaner 10 may be initially positioned in a non-cleaning configuration. The non-cleaning configuration is illustrated in FIG. 1. As illustrated in FIG. 1, the arm 20 is lowered such that the cleaning tool 22 is clear of a bottom edge 104 of the wheel 12.

Next, in step 206, the robotic wheel cleaner 10 is actuated so as to move the cleaning tool 22 to a first plane cleaning start position. The first plane cleaning start position is illustrated in FIG. 2. As illustrated in FIG. 2, the body portion 24 is moved into an extended position and the arm 20 is pivoted at second articulated joint 16 such that the operation end 46 is moved upwardly toward the open end 102 of the wheel 12. In this configuration, the cleaning tool 22 is positioned within the wheel 12. The cleaning pad 58 is moved against a first plane 106 of the inner surface 100 of the wheel 12. The force sensing unit 55 may be used to enable not only proper placement of the cleaning pad 58, but ensure full application of the cleaning pad 58 against the first plane 106. More specifically, the force sensing unit 55 may be configured with a positon feedback will not initiate a cleaning operation until the sensing unit 55 detects a threshold force.

Once the cleaning pad 58 is seated against the first plane 106, a first cleaning operation is undertaken in step 208. More specifically, the cleaning pad 58 of moved across the first plane 106 until it reaches a first plane stop position. The first plane stop position is shown in FIG. 3. To accomplish this action, the mount element 50 is rotated in a first direction. The rotation of the mount element 50 causes the cleaning tool 22 to rotate along the arc of the first plane 106. In one exemplary arrangement, the arc of the first plane 106 is less than 90° with respect to a central axis extending through the wheel 12. In another exemplary arrangement, the arc of the first plane 106 is less than 45°. Further, the first plane cleaning start position and the first plane stop position are located on either side of the predetermined location of the balance weights to ensure a fully cleaned area.

Because the balance weights only need to be positioned at predetermined positions, the cleaning pad 58 only needs to clean along the area where the balance weight is to be applied. In this manner, the time for performing the cleaning operation may be reduced over prior art systems as only a small area requires cleaning.

Figure 4:
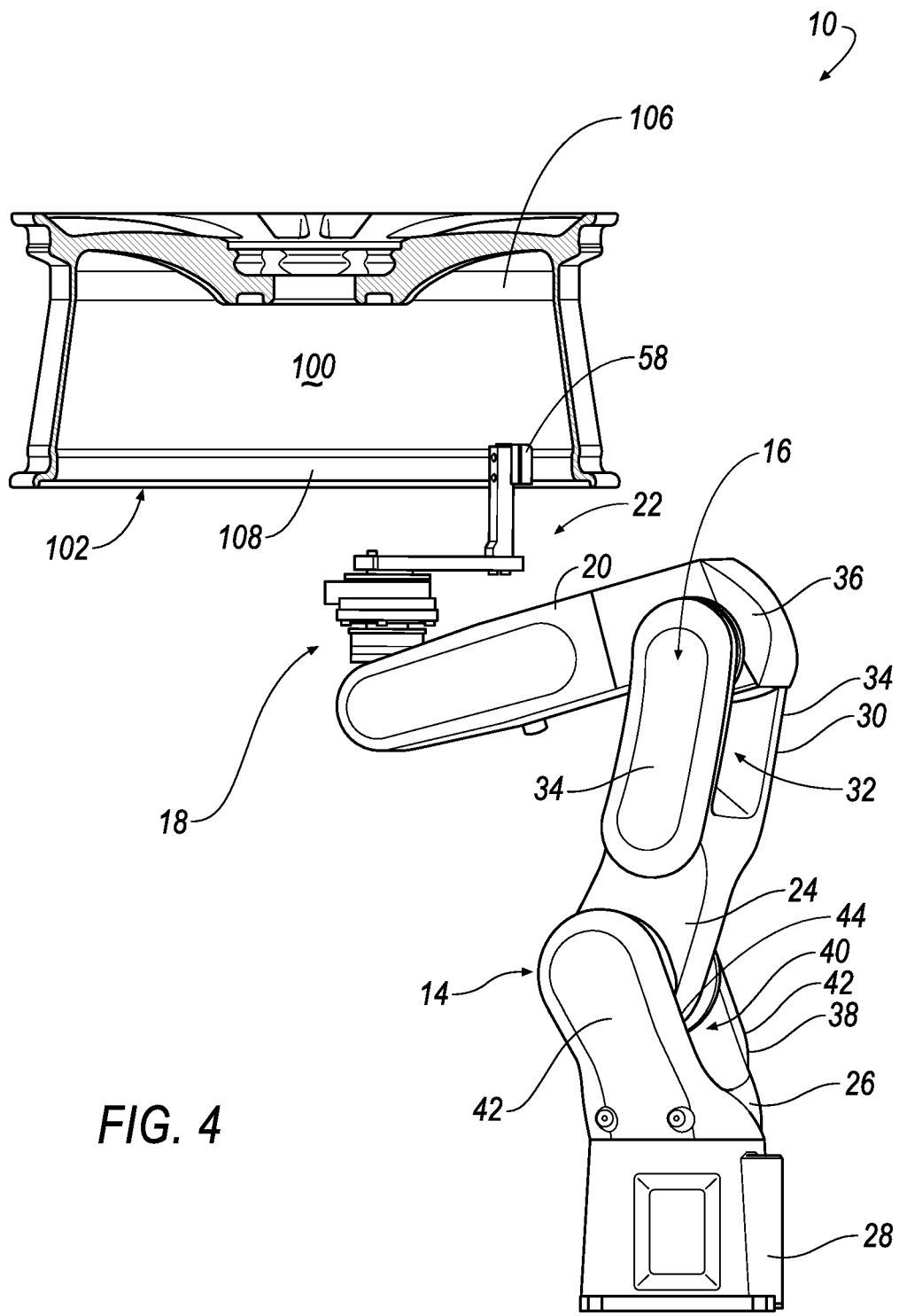
FIG. 4 is a side elevational view of the robotic wheel cleaner in a first lower plane cleaning start position.

Once the predetermined location of the first plane 106 is cleaned, the process 200 moves to step 210. In step 210, the robotic wheel cleaner 10 lowers the cleaning tool 22 to a second plane cleaning start position. As illustrated in FIG. 4, the body portion 24 is moved into a retracted position and the arm 20 is pivoted at second articulated joint 16 such that the operation end 46 of the arm 20 is moved downwardly below the open end 102 of the wheel 12. In this configuration, the cleaning tool 22 is partially positioned within the wheel 12. More specifically, in one arrangement, the cleaning pad 58 is positioned within the wheel 12. The cleaning pad 58 is moved against a second plane 108 of the inner surface 100 of the wheel 12. The second plane start position is positioned approximately 180 degrees from the first plane start position and spaced vertically from the first plane start position. Again, the force sensing unit 55 may be used to enable not only proper placement of the cleaning pad 58, but ensure full application of the cleaning pad 58 against the second plane 108.

Figure 5:
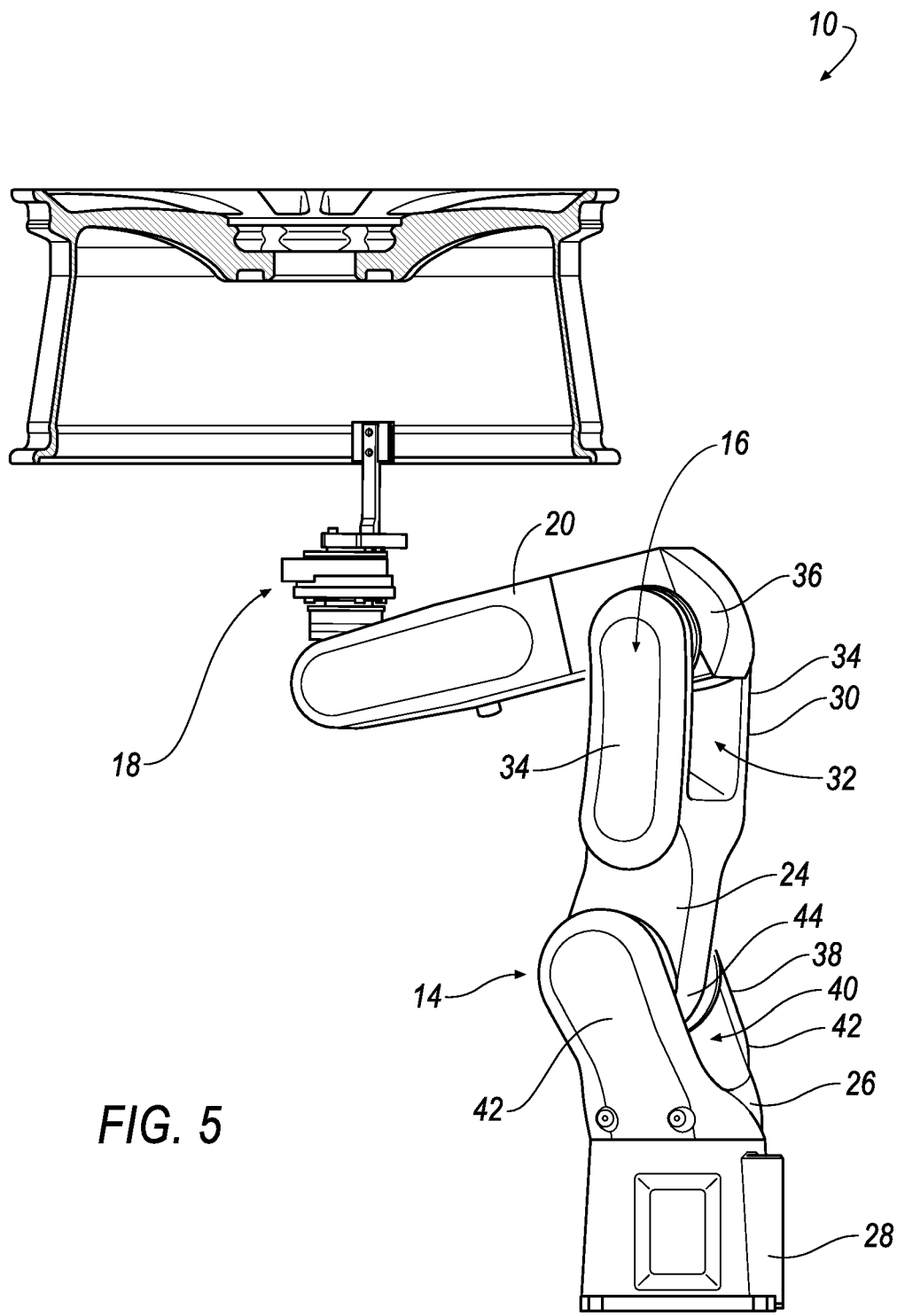
FIG. 5 is a side elevational view of the robotic wheel cleaner in a first lower plane end position.
Figure 6:
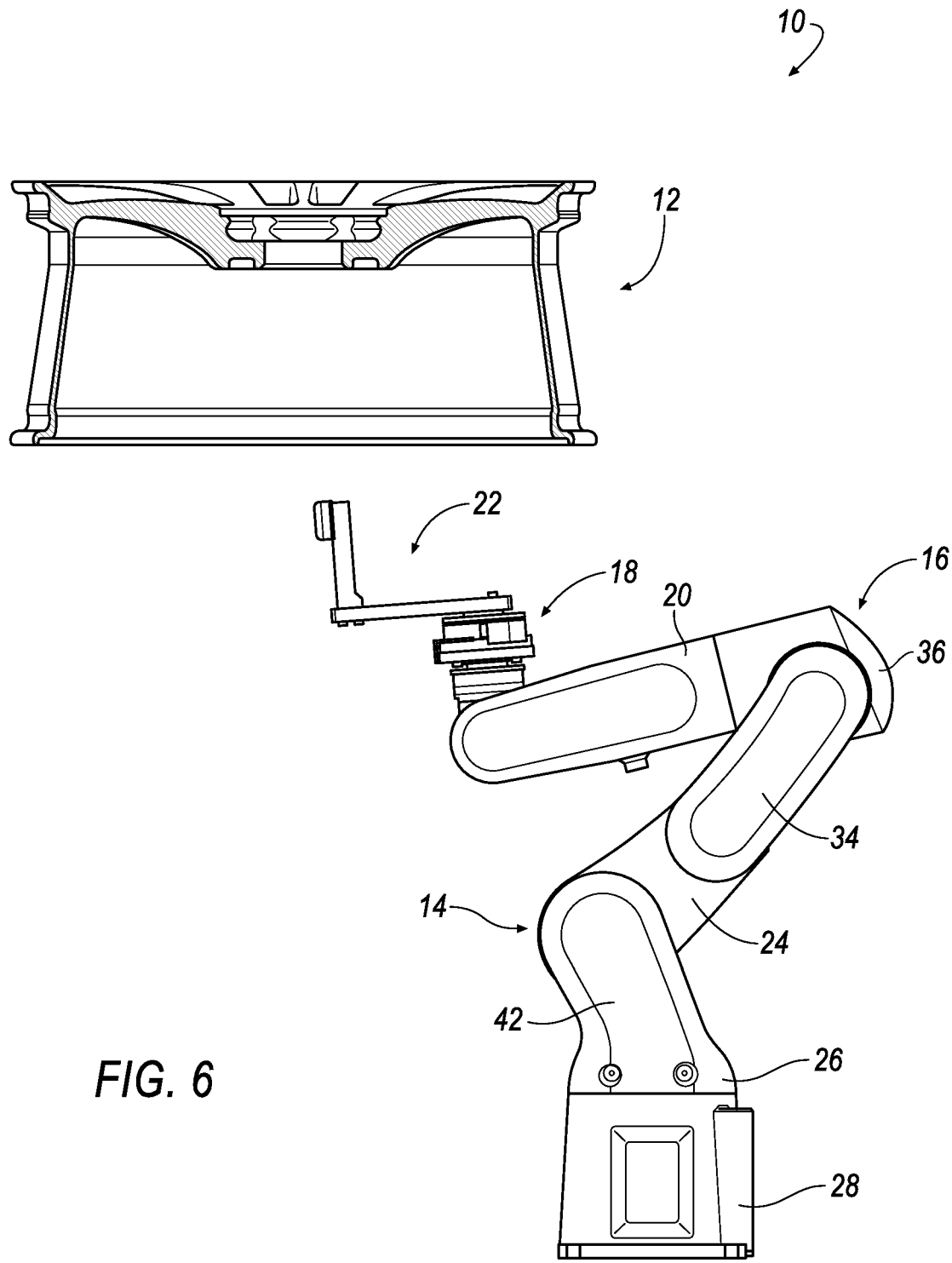
FIG. 6 is a side elevational view of the robotic wheel cleaner in the retracted position with respect to the wheel.

Once the cleaning pad 58 is seated against the second plane 108, a second cleaning operation is undertaken in step 212. More specifically, the cleaning pad 58 is moved across the second plane 108 until it reaches a second plane stop position. The second plane stop position is shown in FIG. 5. To accomplish this action, the mount element 50 is rotated in a second direction (that may be opposite the first direction). The rotation of the mount element 50 causes the cleaning tool 22 to rotate along the arc of the second plane 108.

In step 214, the robotic wheel cleaner 10 is lowered back into the non-cleaning configuration such that the arm 20 is lowered until the cleaning tool 22 is clear of a bottom edge 104 of the wheel 12.

Once the predetermined areas of the wheel 12 are cleaned, the sections of the weight material may be delivered to a weight apply apparatus/member, such as a robotic end of arm tool weight apply apparatus (not shown). In one exemplary arrangement, the cleaning pad 58 may be mounted on the same end of arm tool weight apply apparatus such that the weight may be applied to the first plane 106 immediately after the first cleaning operation, and the weight may be applied to the second plane 108 immediately after the second cleaning operation. With this configuration, the weight application operation may be accomplished in quicker time than traditional weight application processes. Further, as the controller has the locations stored for applying the balance weights, there will be no need to reconfirm application locations if a different weight apply robot it used. Moreover, the footprint of a weight apply operation equipment may be reduced with the present arrangement.

In yet another exemplary configuration, the holder element 56 of the cleaning tool 22 may be removed from the mounting bracket 54 after the cleaning operation 200 and replaced with the weight apply apparatus.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A robotic wheel cleaner configured for performing a cleaning operation on a wheel, comprising:
   a selectively moveable arm that is operatively connected to a body portion at a first end thereof; and
   a cleaning tool that is operatively connected to a second end of the moveable arm to selectively move along a first predetermined pathway to clean at least a predetermined portion of the wheel;
   wherein the cleaning tool further includes
   a cleaning pad configured for selectively engaging at least a first predetermined location of a wheel,
   a holder element attached to the cleaning pad, and
   a mounting bracket selectively attached to the holder element and defining a channel therethrough that receives at least one fastener element to selectively position and fix the holder element along the mounting bracket, wherein the mounting bracket further includes indicia that is indicative of various positions along the channel that correspond to various sized wheels and wherein the holder element is configured to be selectively attached within the channel of the mounting bracket at the indicia corresponding to a respective wheel size so that the cleaning tool can clean the predetermined portion of the wheel.

2. The robotic wheel cleaner of claim 1, wherein the cleaning pad is removably attached to the holder element to allow for selectively replacement of the cleaning pad.

3. The robotic wheel cleaner of claim 1, wherein the moveable arm is configured to move to a second predetermined location of the wheel, wherein the cleaning tool is selectively movable along a second predetermined pathway to clean at least a second predetermined portion of the wheel.

4. The robotic wheel cleaner of claim 3, wherein the second predetermined pathway is positioned approximately 180° from the first predetermined pathway.

5. The robotic wheel cleaner of claim 3, wherein the first predetermined pathway is an arc that is less than 90 degrees from a center point in the wheel.

6. The robotic wheel cleaner of claim 3, wherein the first predetermined pathway is an arc that is less than 45 degrees from a center point in the wheel.

7. The robotic wheel cleaner of claim 3, wherein the second predetermined pathway is an arc that is less than 90 degrees from a center point in the wheel.

8. The robotic wheel cleaner of claim 3, wherein the second predetermined pathway is an arc that is less than 45 degrees from a center point in the wheel.

9. The robotic wheel cleaner of claim 1, further comprises a force feedback sensor operatively connected to the cleaning tool.

10. The robotic wheel cleaner of claim 9, wherein the force feedback sensor is operatively connected to a controller and the controller will prevent the cleaning tool from moving along the first predetermined pathway unless a threshold of force is detected by the force feedback sensor.

\* \* \* \* \*